United States Patent
Hardee et al.

(10) Patent No.: US 9,928,445 B2
(45) Date of Patent: *Mar. 27, 2018

(54) CONTEXTUAL DETERMINATION OF USER PHOTOS

(71) Applicant: International Business Machines Corporation, Armonk, NY (US)

(72) Inventors: Christopher J. Hardee, Raleigh, NC (US); Steven R. Joroff, Tokyo (JP); Pamela A. Nesbitt, Ridgefield, CT (US); Scott E. Schneider, Rolesville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/934,376

(22) Filed: Nov. 6, 2015

(65) Prior Publication Data

US 2017/0132494 A1 May 11, 2017

(51) Int. Cl.
| | |
|---|---|
| *G06K 9/62* | (2006.01) |
| *G06F 17/21* | (2006.01) |
| *G06K 9/20* | (2006.01) |
| *H04L 29/08* | (2006.01) |
| *G06F 17/27* | (2006.01) |

(52) U.S. Cl.
CPC ........... *G06K 9/6267* (2013.01); *G06F 17/21* (2013.01); *G06F 17/2785* (2013.01); *G06K 9/2054* (2013.01); *G06K 9/6215* (2013.01); *H04L 67/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,035,467 | B2 * | 4/2006 | Nicponski | G06K 9/00221 382/190 |
| 8,867,849 | B1 * | 10/2014 | Kirkham | G06F 17/30268 382/224 |
| 2008/0249856 | A1 * | 10/2008 | Angell | G06Q 30/02 705/14.67 |
| 2009/0006551 | A1 * | 1/2009 | Guday | G06Q 10/10 709/204 |
| 2012/0246302 | A1 * | 9/2012 | Lafleur | G06Q 30/02 709/224 |

(Continued)

OTHER PUBLICATIONS

IBM, "List of IBM Patents or Patent Applications Treated as Related (Appendix P)," Oct. 13, 2016, p. 1-2.

(Continued)

*Primary Examiner* — Tsung-Yin Tsai
(74) *Attorney, Agent, or Firm* — Reza Sarbakhsh

(57) ABSTRACT

A computer detects one or more images, wherein detecting the one or more images further includes identifying one or more characteristics of at least a portion of the one or more images. The computer detects one or more user communications. The computer determines one or more appropriate images of the one or more images to be associated with the one or more user communications based on comparing information associated with the one or more user communications with the identified one or more characteristics of at least a portion of the one or more images.

15 Claims, 2 Drawing Sheets

(56) References Cited

U.S. PATENT DOCUMENTS

2013/0282808 A1* 10/2013 Sadanandan ........... G06Q 10/10
709/204
2014/0157153 A1* 6/2014 Yuen ..................... A63F 13/537
715/758

OTHER PUBLICATIONS

Hardee et al., "Contextual Determination of User Photos," Application and Drawings, Filed on May 2, 2016, 21 Pages, U.S. Appl. No. 15/144,176.
Fowler, "NFL suspends WR Josh Gordon," ESPN, http://espn.go.com/nfl/story/_/id/12275102/nfl-suspends-josh-gordon-cleveland-browns-least-one-year, Feb. 4, 2015, Printed on Oct. 28, 2015, pp. 1-9.
Hampson et al., "A Method or System for Identifying the Context of an Event, and Recommending a Cover Photo for the Event Based on the Context," ip.com, IP.com No. 000236528, May 1, 2014, pp. 1-3.

* cited by examiner

CONTEXTUAL DETERMINATION OF USER PHOTOS

TECHNICAL FIELD

The present invention relates to attributes of user photos, and more particularly to determining appropriate user photos based on context.

BACKGROUND

In the digital age, the utilization of photos when commenting in or participating in an internet based communication, such as a forum or social media feed. There are hardly any users that choose not to add the personal touch of a photo to comments and personal pages such as social media pages. The utilization of a photo in association with a comment not only adds life to the comment but allows other users to have a glimpse into the life of the user.

SUMMARY

The present invention provides a method, system, and computer program product identifying an image. A computer detects one or more images, wherein detecting the one or more images further includes identifying one or more characteristics of at least a portion of the one or more images. The computer detects one or more user communications. The computer determines one or more appropriate images of the one or more images to be associated with the one or more user communications based on comparing information associated with the one or more user communications with the identified one or more characteristics of at least a portion of the one or more images.

DETAILED DESCRIPTION

Embodiments of the present invention will now be described in detail with reference to the accompanying Figures.

Figure 1:
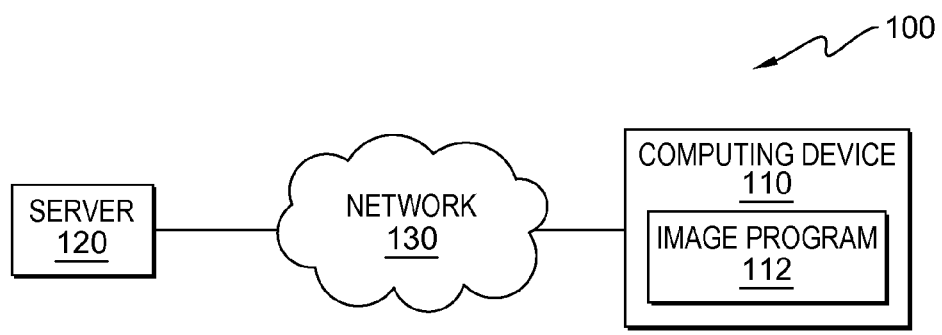
FIG. 1 illustrates an image system, in accordance with an embodiment of the invention.

FIG. 1 illustrates image system 100, in accordance with an embodiment of the invention. In an exemplary embodiment, image system 100 includes computing device 110 and server 120 interconnected via network 130.

In the exemplary embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a local area network (LAN), or a wide area network (WAN). In general, network 130 can be any combination of connections and protocols that will support communications between computing device 110 and server 120.

Server 120 may be a desktop computer, a notebook, a laptop computer, a tablet computer, a handheld device, a smart-phone, a thin client, or any other electronic device or computing device system capable of receiving and sending data to and from other computing devices, such as computing device 110 via a network, such as network 130. Although not shown, optionally, server 120 can comprise a cluster of web devices executing the same software to collectively process requests. Server 120 is described in more detail with reference to FIG. 3.

Computing device 110 includes image program 112. Computing device 110 may be a desktop computer, a notebook, a laptop computer, a tablet computer, a handheld device, a smart-phone, a thin client, or any other electronic device or computing system capable of receiving and sending data to and from other computing devices, such as server 120, via a network, such as network 130. Although not shown, optionally, computing device 110 can comprise a cluster of web devices executing the same software to collectively process requests. Computing device 110 is described in more detail with reference to FIG. 3.

In the example embodiment, image program 112 is a program capable of receiving input, such as keywords associated with an image, from the user of computing device 110. Image program 112 is also capable of determining one or more additional keywords to associate with an image by way of utilizing object recognition software. Additionally, image program 112 is capable of receiving information from other computing devices, such as server 120, via network 130, and determining an appropriate image for a user comment based on the received information. In one embodiment, image program 112 may be fully or partially integrated with a social media site or professional network. The operations and functions of image program 112 are described in more detail with reference to FIG. 2.

Figure 2:
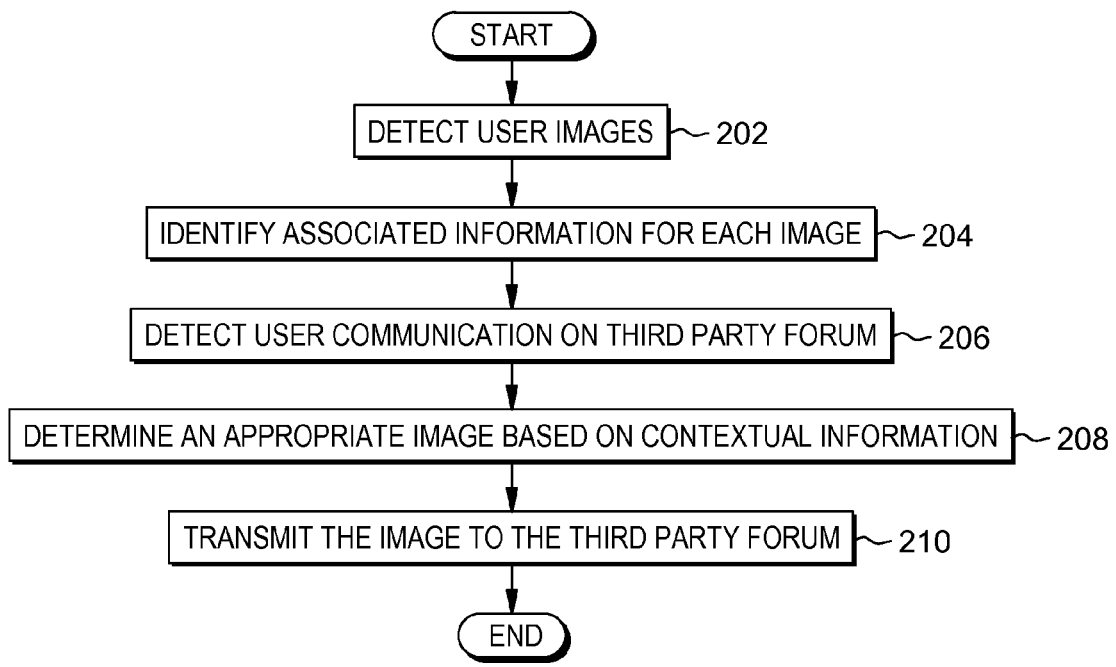
FIG. 2 is a flowchart illustrating the operations of the image program of FIG. 1, in accordance with an embodiment of the invention.

FIG. 2 is a flowchart illustrating the operations of image program 112 in determining an appropriate image for a user posting, in accordance with an embodiment of the invention. In the example embodiment, image program 112 detects user images (step 202). In the example embodiment, image program 112 may detect a user selection of an array of images available on the social media sit of the user or may include the entirety of images available on the social media site of the user. In addition, image program 112 may detect a user selection of images present on computing device 110, another computing device, or an external device. Additionally, image program 112 may detect all images associated with the user available through any of the previously mentioned outlets (websites, social media sites, computing devices, etc).

Image program 112 identifies associated information for each detected image (step 204). In the example embodiment, image program 112 receives user input via a user interface, such as keywords to associate with one or more of the detected images. For example, the user may input the keyword "football" with regard to an image. The keywords is then stored in metadata associated with the image for future reference. In addition, image program 112 may additionally utilize object recognition software to determine additional keywords to associate with an image. For example, if an image depicts the user throwing a football, image program 112 utilizes object recognition software to identify a football within the image, and subsequently associates the keyword "football" with the image. Furthermore, image program 112 may receive additional input that indicates situations, event, occurrences, and/or days/times the image is appropriate for. In the example embodiment, image program 112 stores this additional information in the metadata associated with the image for future reference. In another embodiment, image program 112 identifies associated information for a user selection or a portion of the detected images.

Image program 112 detects a user communication on a third party forum (step 206). In the example embodiment, image program 112 detects a user communication on a third party forum, such as a forum housed on server 120, by communicating with the operating system and monitoring the use of computing device 110. Examples of a third party forum may include a chat room, a webpage which includes a section for comments, a social media or alternative networking website, a chat within a peer-to-peer messaging program, or another type of website or network communication means.

Image program 112 determines an appropriate image to associate with the user based on contextual information (step 208). In the example embodiment, image program 112 determines an appropriate image based on information retrieved from the third party forum. The information may include: the message posted or transmitted, the content of the webpage/third party forum, the type of forum (for example, a dating site, or fantasy football website), the URL or domain of the third party forum, the context/content of the message thread that the user has commented on or responded to, and a referrer, if any, to the third party forum. A referrer may be, for example, if a user is on a website detailing/depicting cars, and the user clicks on a link within the website which takes him/her to the third party forum, information about the referrer (the car website) may be included in the information retrieved by image program 112. In the example embodiment, image program 112 analyzes the retrieved information and compares the information to the information associated with each detected image associated with the user of computing device 110. For example, image program 112 may analyze the retrieved information and determine that the third party forum is a fantasy football website, and utilize language processing techniques, such as locating keywords and natural language processing, to determine that the content of the user communication within the forum contains the keywords "football", and "Green Bay Packers®" ("Packers" is a registered trademark of the Green Bay Packers), image program 112 determines that the user communication is associated with football and specifically with the football team the "Green Bay Packers". Image program 112 may then analyze the associated information of each image in order to determine whether an image contains associated information detailing "football" and/or the "Green Bay Packers". If image program 112 is able to identify an image which has associated information detailing both terms, then the image is chosen as an appropriate image (for example, an image featuring a person wearing a "Green Bay Packers" jersey may have associated information detailing both terms).

In another embodiment, image program 112 may take the user that the user communication is intended for (directed to) into account. For example, image program 112 may determine that the user communication is directed to User B, for example, the user of computing device 110 may comment on a thread created by User B or respond to a comment created by User B. In this situation, image program 112 may determine that an image containing both the user of computing device 110 and User B is an appropriate image. Alternatively, image program 112 may determine characteristics, such as interests and the profession of User B and choose an appropriate image based on the determined characteristics. In this embodiment, image program 112 may reference a social media account or professional network account of User B in order to retrieve relevant information.

In yet another embodiment, image program 112 may be provided keywords associated with the third party forum or the comments within the forum that image program 112 may utilize in determining an appropriate image. Furthermore, information associated with the user, such as a tagline, may also be utilized in determining an appropriate image. Additionally, context information regarding the user may also be utilized in determining an appropriate image. For example, image program 112 may identify contextual information associated with the user such as the user's location, the user's time zone/local time, a local season, local weather (or upcoming weather), the user's profession, the user's interests, or any other information associated with characteristics of the user. Even further, image program 112 may take a sentiment of the user communication into account when determining an appropriate image. Image program 112 may utilize language processing techniques in order to determine a sentiment associated with the user communication. In addition, in this embodiment, the detected images may be classified by a sentiment or characteristic based on an analysis of the associated information. Therefore, image program 112 is able to determine the appropriate image for the user communication based on the identified sentiment. In an embodiment, image program 112 may also take the type of discussion/thread and/or forum/website into account when determining an appropriate image. For example, if the user communication occurs on a fantasy football website, image program 112 may determine that an image involving football, such as the user of computing device 110 in a football jersey or an image depicting a famous football announcer is an appropriate image.

Image program 112 transmits the image to the third party forum (step 210). In the example embodiment, image program 112 transmit the image determined to be appropriate to the third party forum for the purpose of displaying the image in association to the user communication. In another embodiment, image program 112 may be integrated into a social media site and therefore, the determined appropriate image is utilized in association with a user communication on the social media site.

In another embodiment, image program 112 may determine a set of appropriate images rather than a single image, in a similar manner as discussed above. The set of appropriate images may then be transmitted to the third party forum for the purpose of display in association with the user communication. Image program 112 may determine each image based on different criteria of the criteria discussed in the previous step (step 208). For example, image program 112 may determine a first image based on a determined sentiment of the user communication while determining a second image based on contextual information of the user. The images may then be overlayed and displayed in association with the user communication (on the third party forum or on an integrated social media site).

In an additional embodiment, image program 112 may rather than selecting an appropriate image, may transmit a set of images along with information associated with each image. In this additional embodiment, the third party forum would make the determination of which image or images are appropriate for the user communication.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Figure 3:
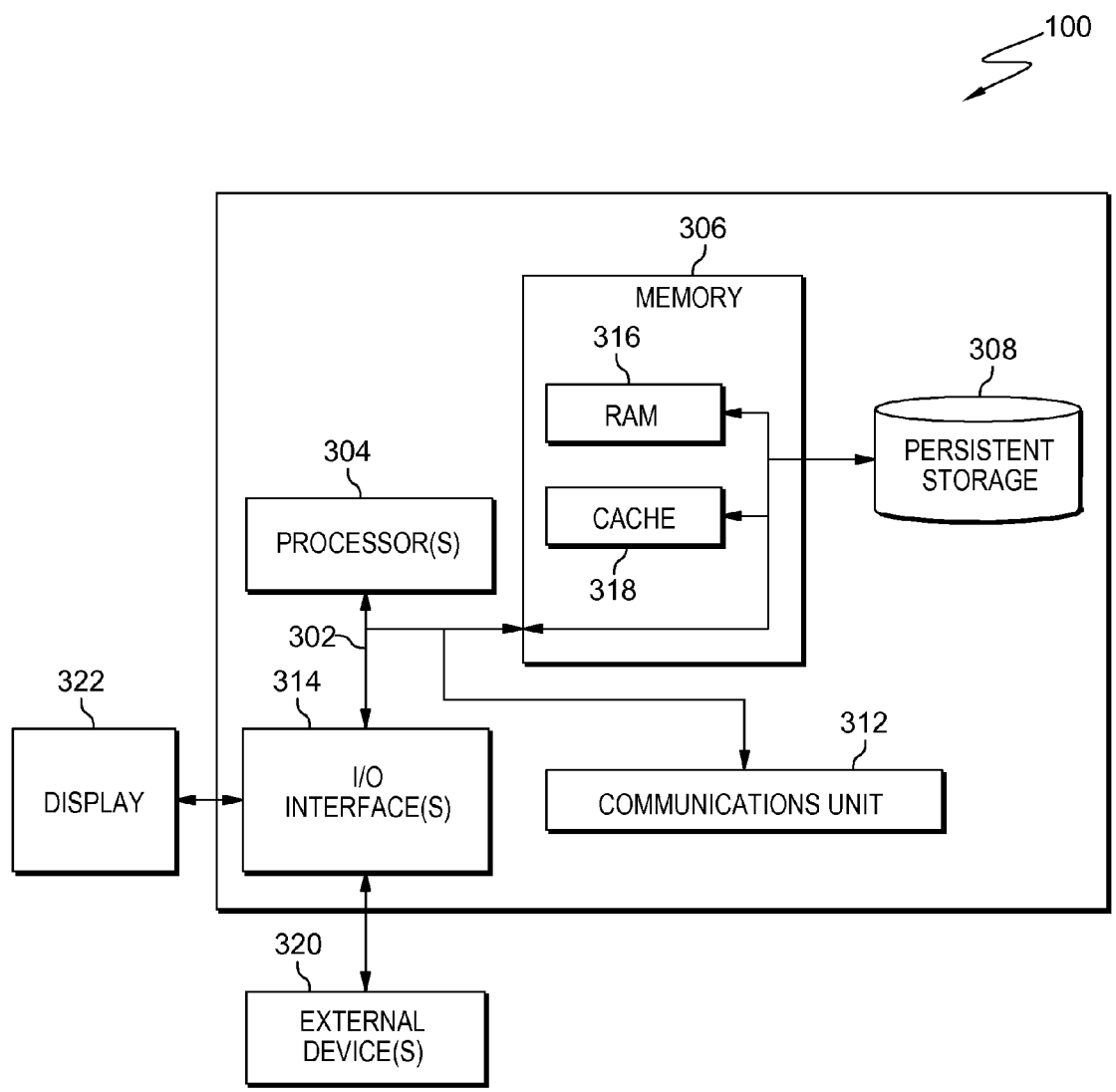
FIG. 3 is a block diagram depicting the hardware components of the image system of FIG. 1, in accordance with an embodiment of the invention.

FIG. 3 depicts a block diagram of components of computing device 110 and server 120 of image system 100 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 and server 120 include communications fabric 302, which provides communications between computer processor(s) 304, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media.

Image program 112 in computing device 110 may be stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links. Image program 112 in computing device 110 may be downloaded to persistent storage 308 through communications unit 312.

I/O interface(s) 314 allows for input and output of data with other devices that may be connected to computing device 110 and server 120. For example, I/O interface 314 may provide a connection to external devices 320 such as, a keyboard, keypad, a touch screen, and/or some other suitable input device. External devices 320 can also include portable computer-readable storage media such as, for example, thumb drives, portable optical or magnetic disks, and memory cards. Software and data used to practice embodiments of the present invention, e.g., image program 112 in computing device 110, can be stored on such portable computer-readable storage media and can be loaded onto persistent storage 308 via I/O interface(s) 314. I/O interface(s) 314 can also connect to a display 322.

Display 322 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge devices. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or device. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for identifying an image, comprising the steps of:

a computer detecting one or more images, wherein the one or more images includes a plurality of user images on websites, social media applications, and computing devices, and wherein detecting the one or more images further includes identifying one or more characteristics of at least a portion of the one or more images;

the computer dynamically detecting one or more user communications on a determined type of forum, wherein the determined type of forum comprises a comments section, and wherein the dynamically detected one or more user communications comprises one or more transmitted comments on the comments section;

the computer determining one or more characteristics associated with the one or more user communications by utilizing natural language processing techniques to analyze the content of the dynamically detected one or more user communications;

the computer determining one or more characteristics of one or more recipients intended to receive the dynamically detected one or more user communications;

the computer determining a sentiment of the dynamically detected one or more user communications;

the computer retrieving information associated with the determined type of forum;

the computer determining one or more appropriate images based on the plurality of user images on websites, social media applications, and computing devices, to be associated with the dynamically detected one or more user communications on the comments section based on the determined one or more characteristics associated with the dynamically detected one or more user communications, the determined one or more characteristics of the one or more recipients intended to receive the dynamically detected one or more user communications, the determined sentiment of the dynamically detected one or more user communications, and the determined type of forum associated with the dynamically detected one or more user communications with the identified one or more characteristics of at least a portion of the one or more images; and the computer dynamically transmitting the determined one or more appropriate images to be associated with the dynamically detected one or more user communications on the comments section.

2. The method of claim 1, wherein identifying one or more characteristics of at least a portion of the one or more images includes at least one of the computer receiving user input including the one or more characteristics, and the computer utilizing object recognition to determine one or more keywords associated with at least a portion of the one or more images.

3. The method of claim 2, wherein the received user input includes information indicating at least one of a situation, an event, an occurrence, a day, and a time when an image of the one or more images is appropriate.

4. The method of claim 1, wherein the user communication is on a third party forum.

5. The method of claim 4, further comprising the computer transmitting the determined one or more appropriate images to the third party forum.

6. A non-transitory computer readable medium for identifying an image, the computer program product comprising:
one or more non-transitory computer-readable storage devices and program instructions stored on at least one of the one or more non-transitory computer-readable storage devices, the program instructions comprising:
program instructions to detect one or more images, wherein the one or more images includes a plurality of user images on websites, social media applications, and computing devices, and wherein detecting the one or more images further includes identifying one or more characteristics of at least a portion of the one or more images;
program instructions to dynamically detect one or more user communications on a determined type of forum, wherein the determined type of forum comprises a comments section, and wherein the dynamically detected one or more user communications comprises one or more transmitted comments on the comments section;
program instructions to determine one or more characteristics associated with the one or more user communications by utilizing natural language processing techniques to analyze the content of the dynamically detected one or more user communications;
program instructions to determine one or more characteristics of one or more recipients intended to receive the dynamically detected one or more user communications;
program instructions to determine a sentiment of the dynamically detected one or more user communications;
program instructions to retrieve information associated with the determined type of forum;
program instructions to determine one or more appropriate images based on the plurality of user images on websites, social media applications, and computing devices, to be associated with the dynamically detected one or more user communications on the comments section based on the determined one or more characteristics associated with the dynamically detected one or more user communications, the determined one or more characteristics of the one or more recipients intended to receive the dynamically detected one or more user communications, the determined sentiment of the dynamically detected one or more user communications, and the determined type of forum associated with the dynamically detected one or more user communications with the identified one or more characteristics of at least a portion of the one or more images; and the computer dynamically transmitting the determined one or more appropriate images to be associated with the dynamically detected one or more user communications on the comments section.

7. The non-transitory computer readable medium of claim 6, wherein the program instructions to identify one or more characteristics of at least a portion of the one or more images includes at least one of program instructions to receive user input including the one or more characteristics, and program instructions to utilize object recognition to determine one or more keywords associated with at least a portion of the one or more images.

8. The non-transitory computer readable medium of claim 7, wherein the received user input includes information indicating at least one of a situation, an event, an occurrence, a day, and a time when an image of the one or more images is appropriate.

9. The non-transitory computer readable medium of claim 6, wherein the user communication is on a third party forum.

10. The non-transitory computer readable medium of claim 9, further comprising program instructions to transmit the determined one or more appropriate images to the third party forum.

11. A computer system for managing a response to a query, the computer system comprising:
one or more processors, one or more computer-readable memories, one or more computer-readable tangible storage devices, and program instructions stored on at least one of the one or more computer-readable tangible storage devices for execution by at least one of the one or more processors via at least one of the one or more memories, the program instructions comprising:
program instructions to detect one or more images, wherein the one or more images includes a plurality of user images on websites, social media applications, and computing devices, and wherein detecting the one or more images further includes identifying one or more characteristics of at least a portion of the one or more images;
program instructions to dynamically detect one or more user communications on a determined type of forum, wherein the determined type of forum comprises a comments section, and wherein the dynamically detected one or more user communications comprises one or more transmitted comments on the comments section;
program instructions to determine one or more characteristics associated with the one or more user communications by utilizing natural language processing techniques to analyze the content of the dynamically detected one or more user communications;
program instructions to determine one or more characteristics of one or more recipients intended to receive the dynamically detected one or more user communications;
program instructions to determine a sentiment of the dynamically detected one or more user communications;
program instructions to retrieve information associated with the determined type of forum;
program instructions to determine one or more appropriate images based on the plurality of user images on websites, social media applications, and computing devices, to be associated with the dynamically detected one or more user communications on the comments section based on the determined one or more characteristics associated with the dynamically detected one or more user communications, the determined one or more characteristics of the one or more recipients intended to receive the dynamically detected one or more user communications, the determined sentiment of the dynamically detected one or more user communications, and the determined type of forum associated with the dynamically detected one or more user communications with the identified one or more characteristics of at least a portion of the one or more images; and program instructions to dynamically transmit the determined one or more appropriate images to be associated with the dynamically detected one or more user communications on the comments section.

12. The computer system of claim 11, wherein the program instructions to identify one or more characteristics of at least a portion of the one or more images includes at least one of program instructions to receive user input including the one or more characteristics, and program instructions to utilize object recognition to determine one or more keywords associated with at least a portion of the one or more images.

13. The computer system of claim 12, wherein the received user input includes information indicating at least one of a situation, an event, an occurrence, a day, and a time when an image of the one or more images is appropriate.

14. The computer system of claim 11, wherein the user communication is on a third party forum.

15. The computer system of claim 14, further comprising program instructions to transmit the determined one or more appropriate images to the third party forum.

* * * * *